March 14, 1933. S. KAMBARA 1,901,396
AUTOMATIC REGULATING AND CONTROLLING GATE
Filed Feb. 10, 1932
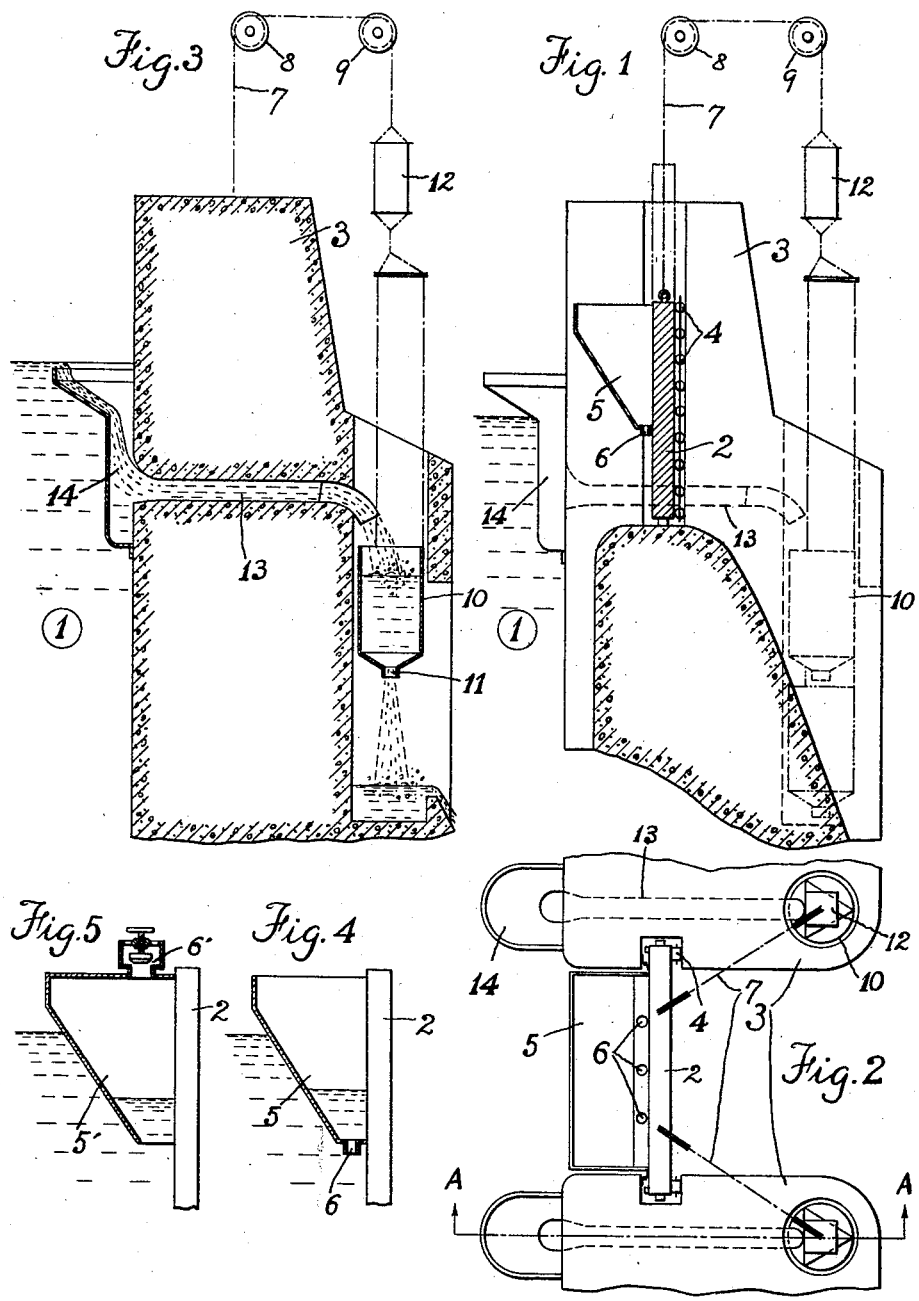

Patented Mar. 14, 1933

1,901,396

UNITED STATES PATENT OFFICE

SHINICHIRO KAMBARA, OF YOKOHAMA, JAPAN

AUTOMATIC REGULATING AND CONTROLLING GATE

Application filed February 10, 1932. Serial No. 592,087.

My invention relates to an automatic regulating and controlling gate which is adapted to be operated by the change of water level in a head tank or reservoir without other motive power such as an electric motor, and has for its object the provision of an entirely automatic gate which is operated responsively to an abrupt change in water level to open the gate and to regulate the lever and which is simple in construction and saves the operating cost and labour of the gate.

The automatic gate of my invention has two functions, one of which is to operate the gate responsively to a rapid change of water level, but not to operate the gate in case of a very slow change of water level in a tank or reservoir, while the other function is to operate the gate in accordance with a predetermined height of water level irrespective of the rapidness of change of the level.

For a better understanding of my invention, the reference is taken to the accompanying drawing, of which Fig. 1 is a sectional side elevation of the gate embodying my invention; Fig. 2 is its plan view; Fig. 3 is a sectional view taken on the line A—A of Fig. 2; Fig. 4 is a side view of the gate in an enlarged scale, the regulating casing being shown in section; and Fig. 5 is a similar view of the gate showing its modification.

Referring to the drawing, 1 represents a portion of a head tank of a hydro-electric power plant or water supply works and the like. 2 represents a regulating gate and 3 is its pier.

The gate 2 is preferably provided with rollers 4 to reduce the sliding friction and to be moved easily. In accordance with this invention the gate 2 is provided with a so-called regulating casing 5 fixed to its front side or dipped side. The casing 5 is preferably so shaped as to give gradually enlarged section up to its top as shown in Fig. 1 for giving more sensitive effect with a slight change of water level. The casing 5 has an open top as shown in Figs. 1 and 4 and a limited communication port 6 at its bottom. The regulating casing 5′ shown in Fig. 5 has the open bottom and closed top which latter is provided with a limited air exhaust port 6′ having an adjusting valve. The gate 2 proper is suspended by the rope 7 over the pulleys 8 and 9 and a vessel 10 having a limited drain hole 11 is fastened to the end of the rope 7. A suitable counterweight 12 may also be fastened to the rope 7 for balancing the dead weight of the gate and the portions attached thereto.

13 represents a conduit or passage provided through the pier. The upper end of the passage 13 communicates to an overflow receiver 14 which may be adjustably secured to the wall of the head tank 1 to limit the upper level of water in the tank to a predetermined height. The passage 13 serves to deliver the over-flowed water into the vessel 10. If the vessel 10 receives water from the passage 13 it acts as the weight for lifting or opening the gate so that the excess water in the head tank may be discharged from the gate and the level of water may be lowered. Thus if the overflow ceases the water in the vessel 10 is exhausted through the drain hole 11 so that the gate 2 may be lowered slowly so as to regulate the discharge responsively to the height of water in the head tank.

If, however, the level of water in the head tank undergoes sudden change, for instance, if the level is rapidly raised, then there occurs a certain difference of head in inside and outside of the regulating casing 5 as seen in Figs. 4 and 5 since in such a sudden change the water can not enter into the casing quickly enough to maintain the same level as that of the head tank owing to the limited passage 6 or 6′. Accordingly the buoyancy acts on the gate so that its weight can be reduced by the weight of water corresponding to the submerged volume of the regulating casing due to the difference of its inside and outside water levels. The gate is thus lifted or opened and it discharges water from the head tank to prevent the excessive rise of level. But if the change of level in the head tank is very slow so that water may flow in the regulating casing 5 without causing a substantial level difference, then there occurs no great buoyancy acting on the gate. When the level is constantly raised slowly and begins to pass over the over-flow receiver 14 the water is supplied into the vessel 10 so that the gate is opened by the weight of water to discharge the excessive water. When the gate is operating at a partial gate opening the regulating casing acts as a damper of the gate against oscillation, since the weight of water existing in the casing counteracts against the upward motion of the gate while its downward motion is resisted by the increase of buoyancy of the regulating casing.

As understood from the foregoing description the gate arrangement embodying my invention can be operated automatically in response to a sudden change of water level as well as a predetermined height of water in the head tank without any other prime mover or operator. The gate can be made to any required size and I have found by actual experiments that a very large gate can be easily and smoothly operated without shock or oscillation and it may be left entirely for self-regulation.

What I claim as new and desire to secure by Letters Patent of the United States, is:

1. An automatic regulating and controlling gate comprising a gate suspended by a rope, a regulating casing secured in front of said gate having means for gradually flowing water therein, a vessel suspended by the rope connected to said gate and having a limited drain hole, an overflow receiver having a passage for discharging water into said suspended vessel, said regulating casing being adapted to increase buoyancy in the case of sudden rise of water level for opening the gate while it being unaffected by the slow rise of level and said suspended vessel being effective to operate the gate when the over-flow of water is discharged into said vessel.

2. An automatic regulating and controlling gate comprising a vertically sliding gate suspended by a rope in balanced condition, an open-topped regulating casing of gradually enlarging section secured to said gate and having a restricted communication passage at its bottom, a vessel connected to the end of said gate suspending rope and having a limited drain hole and an overflow receiver adjustably secured to the head tank wall having a discharge passage for delivering over-flow into said suspended vessel.

3. An automatic regulating and controlling gate comprising a vertically sliding gate, a regulating casing secured to said gate having open bottom and closed top which is provided with a restricted vent opening, said regulating casing having upwardly enlarging section, a vessel suspended by the rope connected to said gate after passing over guide pulleys, said vessel having an adjustable exhaust opening at its bottom, and an over-flow receiver adjustably secured to the head tank wall having a discharge passage for delivering over-flow into said suspended vessel.

In testimony whereof, I have signed my name to this specification this 19th day of January, 1932.

SHINICHIRO KAMBARA.